United States Patent
Duan et al.

(10) Patent No.: US 8,269,243 B2
(45) Date of Patent: Sep. 18, 2012

(54) LED UNIT

(75) Inventors: Wen-Jun Duan, Shenzhen (CN); Chin-Chung Chen, Taipei Hsien (TW)

(73) Assignees: Fu Zhun Precision Indsutry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 208 days.

(21) Appl. No.: 12/795,836

(22) Filed: Jun. 8, 2010

(65) Prior Publication Data
US 2011/0127553 A1   Jun. 2, 2011

(51) Int. Cl.
*H01L 33/00* (2010.01)

(52) U.S. Cl. .................... 257/98; 257/100; 257/E33.059

(58) Field of Classification Search .................... 257/98, 257/100, E33.059
See application file for complete search history.

(56) References Cited

U.S. PATENT DOCUMENTS

| 2005/0174779 A1* | 8/2005 | Yoneda et al. ................ 362/294 |
| 2005/0201118 A1* | 9/2005 | Godo ............................ 362/555 |

* cited by examiner

*Primary Examiner* — Tan N Tran
(74) *Attorney, Agent, or Firm* — Altis Law Group, Inc.

(57) ABSTRACT

An LED (light emitting diode) unit includes an LED and a lens mounted on the LED. The lens defines a passageway at a central portion thereof. The passageway runs through the lens. The lens includes a concave light emitting surface at a top thereof. Light output from the LED with a small light-emission angle travels directly through the passageway, without a loss of light intensity.

18 Claims, 4 Drawing Sheets

LED UNIT

BACKGROUND

1. Technical Field

The disclosure relates to light emitting devices and, more particularly, to a light emitting diode (LED) unit.

2. Description of Related Art

LEDs (light emitting diodes), available since the early 1960's, have been increasingly used in a variety of application fields and are intended to be a high quality replacement for conventional light sources due to high light-emitting efficiency, environmental friendliness, and low power consumption.

Conventionally, light directly output from the LED does not have a desirable pattern; therefore, a light-adjusting element, such as a lens, is used with the LED to adjust the light pattern thereof. All of the light output from the LED must travel through the lens, which inevitably produces a loss of light intensity due to a light refraction or a light reflection or a combination thereof, occurring when the light radiates through the lens. Thus, an LED unit including an LED and a lens obtains a low light emitting efficiency.

What is needed, therefore, is an LED unit which can overcome the limitations described above.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
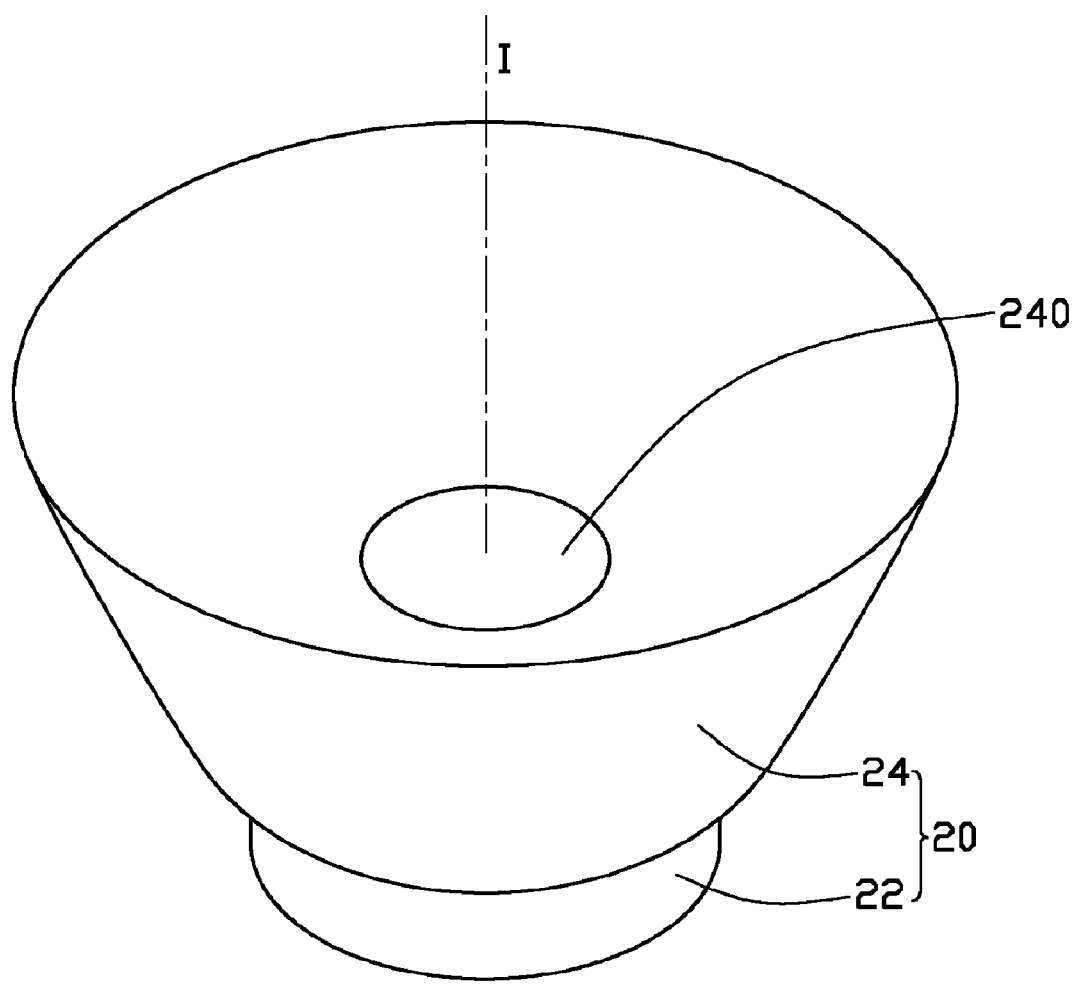
FIG. 1 is an isometric view of a lens of an LED unit in accordance with an embodiment of the disclosure.
Figure 2:
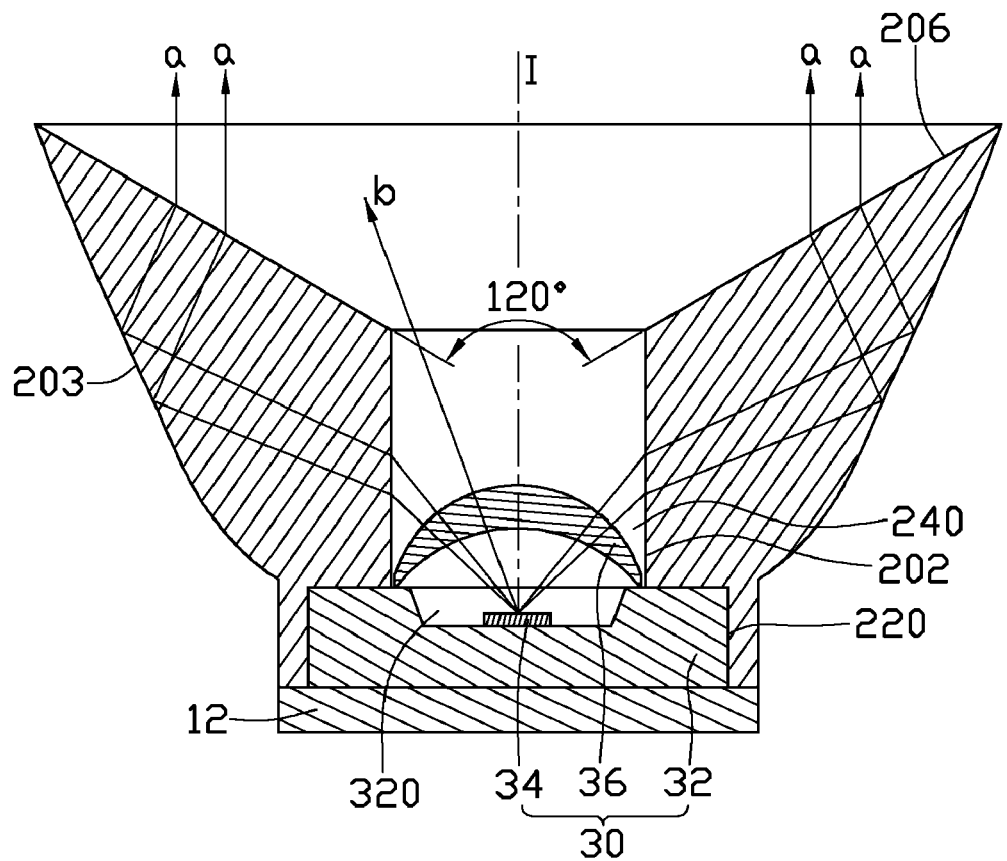
FIG. 2 shows a cross-section of the LED unit with the lens of FIG. 1 mounted on an LED module of the LED unit.

Referring to FIGS. 1 and 2, an LED (light emitting diode) unit in accordance with an embodiment of the disclosure is illustrated. The LED unit comprises a printed circuit board 12, an LED 30, and a lens 20. The LED 30 and the lens 20 are attached to a top surface of the printed circuit board 12.

The printed circuit board 12 may be a MCPCB (Metal Core Printed Circuit Board), a CPCB (Ceramic Printed Circuit Board) or other type PCBs which have good heat dissipation capability. The LED 30 comprises a heat-conducting base 32, an LED die 34 attached to the heat-conducting base 32, and an encapsulant 36 covering the LED die 34 and being fixed on a top of the heat-conducting base 32. The heat-conducting base 32 of the LED 30 is soldered on the printed circuit board 12 to conduct heat generated by the LED die 34 to the printed circuit board 12. The heat-conducting base 32 defines a recess 320 at a center thereof to receive the LED die 34 therein. The encapsulant 36 covers the recess 320 and seals the LED die 34 in the recess 320. The LED die 34 is electrically connected with the printed circuit board 12 via the heat-conducting base 32. The LED die 34 may be an InGaN chip or an InGaAs chip. The encapsulant 36 is made of epoxy, silicon, glass or other transparent materials which have good light-permeable and water-proof capabilities. Phosphor, often in the form of particulates, may be doped within the encapsulant 36 to adjust the color of the light emitted from the LED die 34. The encapsulant 36 is shaped like a dome so as to collimate the light emitted from the LED die 34 into a converged beam. The LED 30 has an optical axis I, around which the light emitted from the LED die 34 and through the encapsulant 36 is symmetrical in a surrounding space.

Figure 3:
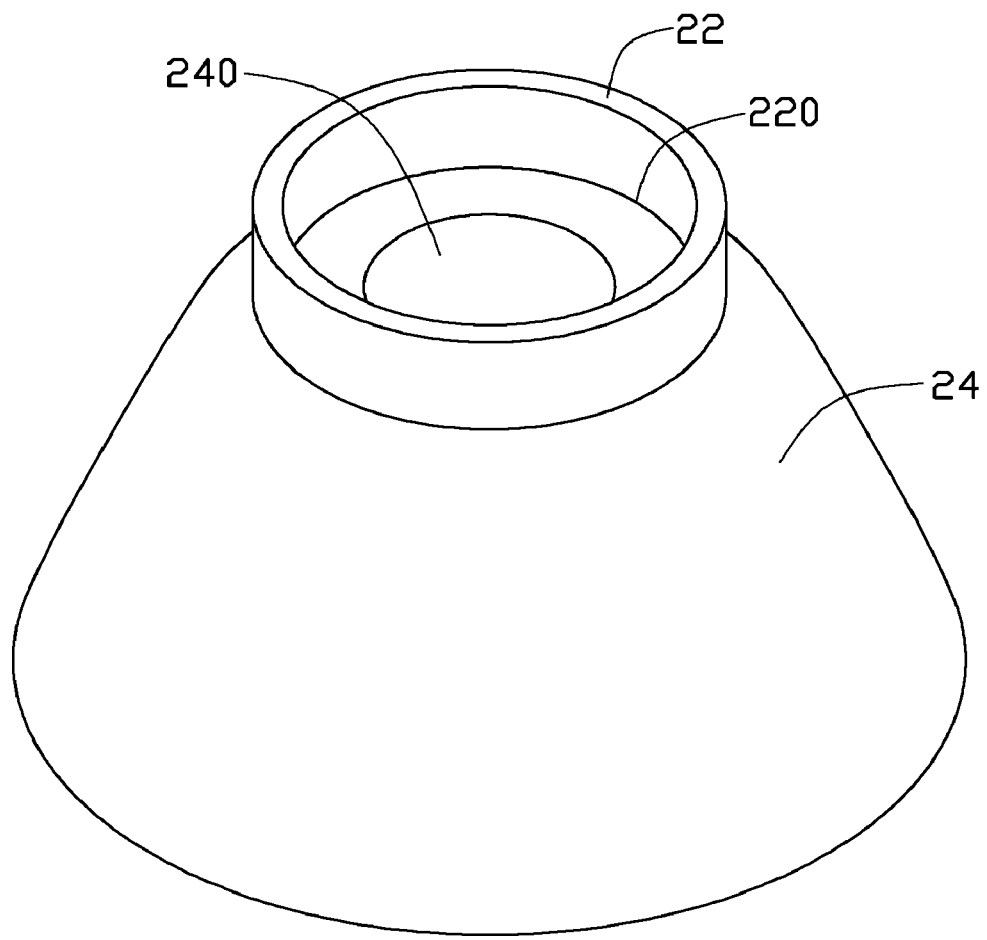
FIG. 3 is an inverted view of the lens of the LED unit of FIG. 1.

Referring also to FIG. 3, the lens 20 is made of transparent material such as PC (polycarbonate) or PMMA (polymethyl methacrylate). The lens 20 comprises a pedestal 22 and an optical member 24 extending upwardly from the pedestal 22. The pedestal 22 contacts the printed circuit board 12 to support the lens 20 on the printed circuit board 12. A kind of glue (not shown) may be smeared on a bottom face of the pedestal 22 to fix the lens 20 on the printed circuit board 12. The pedestal 22 has a circular configuration with a circular recess 220 defined in the bottom face thereof. The circular recess 220 has a size similar to that of the heat-conducting base 32 of the LED 30 so that the heat-conducting base 32 can be engagingly received in the circular recess 220. A passageway 240 is defined in a center of the lens 20. The passageway 240 extends through the bottom face of the pedestal 22 defining the circular recess 220 of the pedestal 22 and a top surface of the optical member 24. The passageway 240 is located above a center of and communicates with the circular recess 220. The passageway 240 is encircled by a columnar face 202 which functions as a light incident surface. The passageway 240 is located over a light emitting surface (i.e., a top surface) of the LED die 34. A diameter of the passageway 240 is smaller than that of the circular recess 220, and identical to or slightly larger than that of the encapsulant 36 of the LED 30. The encapsulant 36 is engagingly received in the passageway 240. Light output from the encapsulant 36 with a large light-emission angle (such as the light "a" shown in FIG. 2) is refracted by the columnar face 202 into the lens 20. Light output from the encapsulant 36 with a small light-emission angle (such as the light "b" shown in FIG. 2) travels directly through the passageway 240, without a loss of light intensity.

The optical member 24 has a bowl-like shape with a concavity defined in a top thereof. An outer circumferential surface of the optical member 24 functions as a light-reflecting face 203 of the lens 20 to totally reflect the light transferred from the columnar face 202 towards a top of the lens 20. Alternatively, the light-reflecting face 203 can be further coated with a reflective layer (such as aluminum layer or silver layer) for promoting light reflection. A diameter of the light-reflecting face 203 of the lens 20 gradually increases from the bottom towards the top of the lens 20. The top surface of the optical member 24 functions as a light emitting surface 206 of the lens 20. The light emitting surface 206 is a concave surface. The light emitting surface 206 is an outer surface of a conical frustum or segment. The conical frustum or segment has a taper of 110° to 130°. In this embodiment, the conical frustum or segment has a taper of 120°. The conical frustum or segment has an axis (not shown) coincidental to the optical axis I of the LED 30.

The light-reflecting face 203 has its top edge directly coupled with a top edge of the light emitting surface 206, and its bottom edge connected to a bottom edge of the columnar face 202 via the pedestal 22. A bottom edge of the light emitting surface 206 is connected directly to a top edge of the columnar face 202, whereby the light emitting surface 206 interconnects the light-reflecting face 203 with the columnar face 202. The light emitting surface 206 takes charge for the light totally reflected by the light-reflecting face 203 to radiate out of the lens 20.

Referring again to FIG. 2, when the LED unit works, a part of the light emitted from the LED 30 with the large light-emission angle is refracted by the columnar face 202 towards the light-reflecting face 203. The light on the light-reflecting face 203 is totally reflected by the light-reflecting face 203 into substantially parallel beams in one of two opposite sides of a cross-section of the LED unit through the optical axis I of the LED 30. The parallel beams are then refracted by the light emitting surface 206 out of the lens 20 in substantially parallel beams (such as the light "a" shown in FIG. 2). The other part of the light emitted from the LED 30 with the small light-emission angle travels directly through the passageway 240, without a loss of light intensity. Due to the other part of the light radiating out of the LED unit without a loss of light intensity, the LED unit obtains a high light emitting efficiency.

Figure 4:
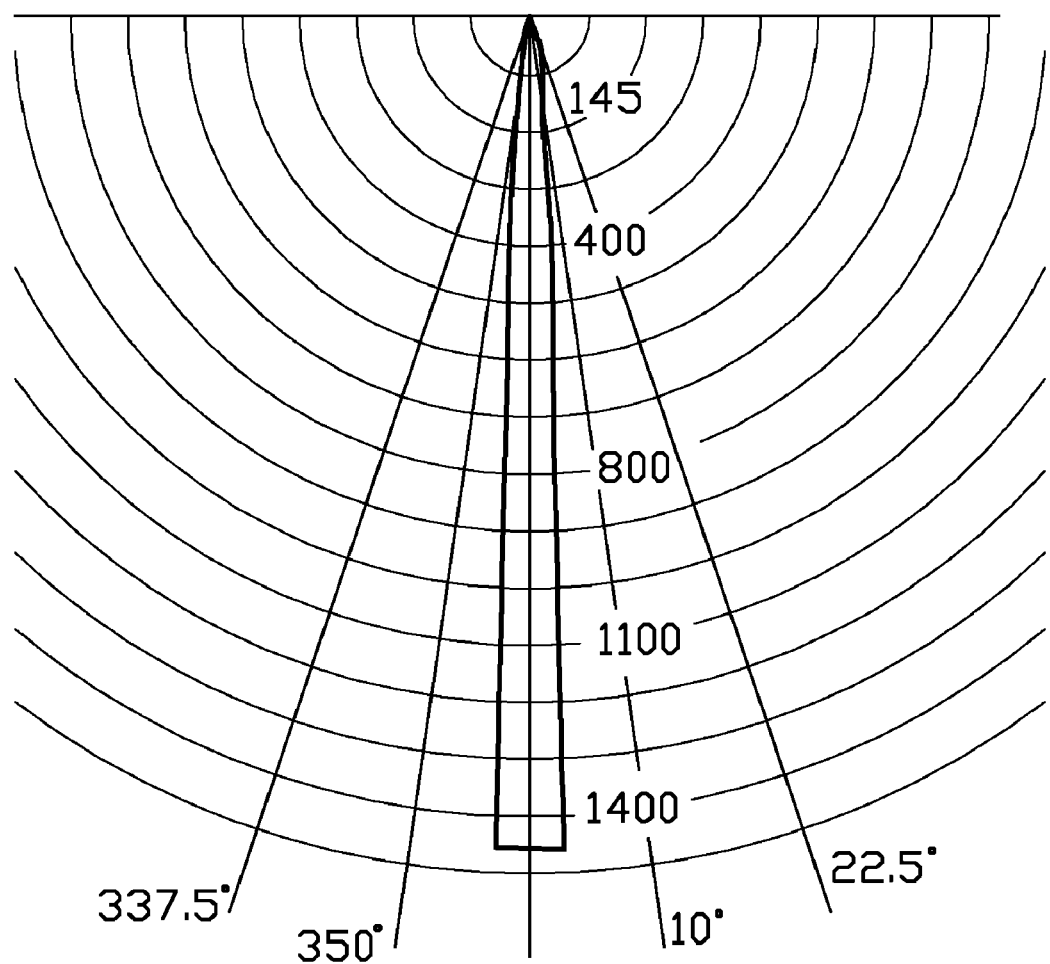
FIG. 4 is a graph of light intensity vs. angle for the LED unit of FIG. 1.

FIG. 4 shows a graph of light intensity vs. angle for the LED unit. Due to the lens 20, a light-emission angle at 10% of a peak light intensity of the LED unit is ranged between 15-25 degrees. In this embodiment, the light-emission angle at 10% of the peak light intensity of the LED unit is 20 degrees. As being adjusted by the columnar face 202, the light-reflecting face 203 and the light emitting surface 206, the light passing through the lens 20 could be effectively converged within a small angle.

In addition, the graph of light intensity is substantially straight at a central portion thereof. This illustrates that the light beam emitted from the LED unit at a central portion of the LED unit is uniformly intensive.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) unit comprising:
   an LED; and
   a lens mounted on the LED, the lens defining a passageway at a central portion thereof, the passageway running through the lens and being located over the LED, the lens comprising a concave light emitting surface at a top thereof, light generated by the LED having a part radiating directly through the passageway to an outside of the lens, without entering the lens.

2. The LED unit of claim 1, wherein the passageway is encircled by a columnar face, the columnar face being taken as a light incident surface.

3. The LED unit of claim 1, wherein the LED comprises an encapsulant for light passing therethrough, the encapsulant being received in the passageway of the lens.

4. The LED unit of claim 2, wherein the LED has an optical axis, the lens having an outer circumferential surface expanding gradually from a bottom to a top of the lens, light projecting on the outer circumferential surface being totally reflected by the outer circumferential surface in substantially parallel beams in one of two opposite sides of a cross-section of the LED unit through the optical axis of the LED.

5. The LED unit of claim 4, wherein the parallel beams are refracted by the concave light emitting surface out of the lens in substantially parallel beams.

6. The LED unit of claim 5, wherein the concave light emitting surface is an outer surface of a conical frustum or segment, the conical frustum or segment having an axis coincidental to the optical axis of the LED.

7. The LED unit of claim 6, wherein the concave light emitting surface connects a top edge of the columnar face with a top edge of the outer circumferential surface, the concave light emitting surface expanding gradually from the top edge of the columnar face to the top edge of the outer circumferential surface.

8. The LED unit of claim 6, wherein the conical frustum or segment has a taper of 110° to 130°.

9. The LED unit of claim 8, wherein the conical frustum or segment has a taper of 120°.

10. The LED unit of claim 5, wherein a light-emission angle at 10% of a peak light intensity of the LED unit is ranged between 15-25 degrees.

11. The LED unit of claim 10, wherein the light-emission angle at 10% of the peak light intensity of the LED unit is 20 degrees.

12. The LED unit of claim 4, wherein the lens is symmetrical relative to the optical axis of the lens.

13. An LED (light emitting diode) unit comprising:
    an LED; and
    a lens mounted on the LED, the lens defining a passageway at a central portion thereof, the passageway running through the lens and being surrounded by a columnar face of the lens, the lens comprising a concave light emitting surface at a top thereof, and an outer circumferential surface expanding gradually from a bottom to a top of the lens;
    wherein a part of light emitted from the LED with a small light-emission angle travels directly through the passageway, and the other part of the light emitted from the LED with a large light-emission angle is refracted by the columnar face towards the light-reflecting face, then reflected by the light-reflecting face, and finally refracted by the concave light emitting surface in substantially parallel beams to radiate out of the lens.

14. The LED unit of claim 13, wherein the lens comprises a pedestal and an optical member extending upwardly from the pedestal, the pedestal having a circular configuration with a circular recess defined in a bottom face thereof, the passageway being defined in a center of the optical member, the passageway being located above a center of and communicating with the circular recess, a diameter of the passageway being smaller than that of the circular recess.

15. The LED unit of claim 14, wherein the LED comprises a heat-conducting base and an LED die attached to the heat-conducting base, the heat-conducting base defining a recess at a center thereof to receive the LED die therein.

16. The LED unit of claim 15, wherein the circular recess of the pedestal has a size similar to that of the heat-conducting base of the LED, the heat-conducting base being engagingly received in the circular recess of the pedestal.

17. The LED unit of claim 16, wherein the LED further comprises an encapsulant covering the LED die and being fixed on a top of the heat-conducting base.

18. The LED unit of claim 17, wherein the diameter of the passageway is slightly larger than that of the encapsulant of the LED, the encapsulant being engagingly received in the passageway.

* * * * *

UNITED STATES PATENT AND TRADEMARK OFFICE
CERTIFICATE OF CORRECTION

PATENT NO. : 8,269,243 B2
APPLICATION NO. : 12/795836
DATED : September 18, 2012
INVENTOR(S) : Wen-Jun Duan et al.

It is certified that error appears in the above-identified patent and that said Letters Patent is hereby corrected as shown below:

On the title page, please replace Item (73) regarding "Assignees" with the following:

(73) Assignees: Fu Zhun Precision Industry (ShenZhen) Co., Ltd., Shenzhen, Guangdong Province (CN); Foxconn Technology Co., Ltd., Tu-Cheng, New Taipei (TW)

Signed and Sealed this
Twenty-ninth Day of October, 2013

Teresa Stanek Rea
*Deputy Director of the United States Patent and Trademark Office*